United States Patent [19]
Sergeant et al.

[11] Patent Number: 5,627,616
[45] Date of Patent: May 6, 1997

[54] SURVEILLANCE CAMERA SYSTEM

[75] Inventors: Ronald G. Sergeant, High Point, N.C.; Scott A. Corbin, Stevens, Pa.; Theodore L. Jones, Akron, Pa.; Gopi N. Mehrotra; Jennifer L. Randall, both of Lancaster, Pa.

[73] Assignee: Philips Electronics North America Corporation, New York, N.Y.

[21] Appl. No.: 263,918

[22] Filed: Jun. 22, 1994

[51] Int. Cl.⁶ .................... G03B 29/00; G03B 396/427
[52] U.S. Cl. ............................................. 354/81; 348/143
[58] Field of Search ..................... 354/81; 352/243; 348/143

[56] References Cited

U.S. PATENT DOCUMENTS

| | | |
|---|---|---|
| 1,945,112 | 1/1934 | Hogan . |
| 2,415,563 | 2/1947 | Nash . |
| 3,398,664 | 8/1968 | Bonatsos . |
| 3,437,753 | 4/1969 | Stith . |
| 3,720,147 | 3/1973 | Bemis . |
| 3,732,368 | 5/1973 | Mahlab . |
| 3,739,703 | 6/1973 | Behles . |
| 4,058,831 | 11/1977 | Smith . |
| 4,080,629 | 3/1978 | Hammond et al. . |
| 4,160,999 | 7/1979 | Claggett . |
| 4,233,634 | 11/1980 | Adams . |
| 4,499,490 | 2/1985 | Morgan . |
| 4,654,703 | 3/1987 | Viera ......................... 358/108 |
| 4,655,567 | 4/1987 | Morley . |
| 4,673,268 | 6/1987 | Wheeler et al. . |
| 4,833,534 | 5/1989 | Paff et al. . |
| 4,847,543 | 7/1989 | Fellinger . |
| 4,855,823 | 8/1989 | Struhs et al. . |
| 4,901,146 | 2/1990 | Struhs et al. . |
| 4,918,473 | 4/1990 | Blackshear . |
| 4,974,088 | 11/1990 | Sasaki ......................... 358/210 |
| 4,984,089 | 1/1991 | Stiepel et al. . |
| 5,028,997 | 7/1991 | Elberbaum . |
| 5,111,288 | 5/1992 | Blackshear ..................... 358/108 |
| 5,164,827 | 11/1992 | Paff . |
| 5,223,872 | 6/1993 | Stiepel et al. . |
| 5,289,091 | 2/1994 | Wada . |
| 5,394,209 | 2/1995 | Stiepel et al. . |

FOREIGN PATENT DOCUMENTS

| | | |
|---|---|---|
| 0544996 | 8/1992 | European Pat. Off. . |
| 0525482 | 2/1993 | European Pat. Off. . |

OTHER PUBLICATIONS

Product Specification, "Light Duty Indoor Pan and Tilt Drives", Burle Industries, Inc. (Security Products Division) (May 1988).

Product Specification, "TC6410A Series Weatherproof Outdoor Pan/Tilts", Burle Industries, Inc. (Security Products Division) (Oct. 1992).

Product Specification, "Weatherproof Medium Duty Outdoor Pan and Tilt Drives", Burle Industries, Inc. (Security Products Division) (Nov. 1990).

Product Specification, "Weatherproof Heavy Duty Pan and Tilt Drive", Burle Industries, Inc. (Security Products Division) (Jul. 1989).

*Primary Examiner*—David M. Gray
*Attorney, Agent, or Firm*—Michael E. Marion

[57] ABSTRACT

A camera module for use in a surveillance camera system is provided. The camera module includes a housing and a pan-and-tilt mechanism that is mounted to the housing. The pan-and-tilt mechanism includes a pan motor for panning a camera and a tilt motor for tilting the camera. The pan motor is mounted on the pan-and-tile mechanism so as to be stationary relative to the housing. A slip ring, mounted to the pan-and-tilt mechanism, provides electrical connections to the tilt motor and the camera and a flex cable connects the camera to the slip ring. Also provided are methods for controlling unique functions of the surveillance camera system. Calibration of a home pan position for the camera is achieved by monitoring an optical homing sensor. Calibration of a home tilt position for the camera is accomplished by driving the camera against a stop. Thereafter, pan and tilt positions of the camera are tracked relative to the home pan and tilt positions. The electric current for energizing the tilt and pan motors is controlled in relation to the motor speed. In addition, an auto-pivot feature provides automatic pivoting of the camera when the camera is in a vertical position. A tour feature is included for playing back a recorded sequence of camera pan and tilt positions. A speed scaling feature automatically adjusts panning and tilting speeds of the camera based on the distance of a target from the camera.

12 Claims, 7 Drawing Sheets

FIG. 10

SURVEILLANCE CAMERA SYSTEM

FIELD OF THE INVENTION

The present invention relates to surveillance camera systems and, more specifically, to a remote camera module having a unique combination of features for a surveillance camera system and method for automatically controlling the unique combination functions within the surveillance camera system.

BACKGROUND OF THE INVENTION

Surveillance camera systems are commonly used to monitor various areas in a place of business, such as cashier windows at a bank or gambling tables at a casino. Typically, an operator of such a surveillance system is located at a central location from which he/she controls one or more camera units that are remotely positioned throughout the area to be monitored. The remote units are often mounted in hemispherical domes that are suspended from the ceiling of the monitored area. By using a keyboard console, the operator selects images from the remote cameras to be displayed on one or more video monitors. Some systems include a joy stick on the control console to permit the operator to reposition a camera in order to obtain a better view of a particular zone of observation.

State of the art video cameras include a plurality of adjustable features. Consequently, as the number of cameras in a surveillance system increases, the task of controlling the cameras becomes significantly more difficult. As a result, the operator must spend a significant amount of time on adjusting the various camera functions, and thus has less time to spend viewing the images acquired by the cameras. Moreover, the complexity of video cameras and surveillance units now being used in camera surveillance systems and the multitude of adjustable features incorporated in them further increases the difficulty of the operator's function. Consequently, a need has arisen for means to more readily control the greater array of functions available in a camera surveillance system, in order to operate such a system more effectively.

One particular problem that is frequently encountered occurs when a person being observed through a remote camera surveillance unit walks directly below the remote camera unit and then continues walking beyond the unit. Generally, such a person is tracked by operating the joy stick on the camera control console while simultaneously observing the person's movement on a video monitor. However, when the person passes under the dome, one of two problems occurs. Either the image on the monitor appears inverted or the operator neglects to manually pivot the camera in order to maintain a proper image and, at least temporarily, loses site of the person being tracked. It would be highly advantageous to have a surveillance camera system that automatically pivots the camera under such circumstances.

Another difficulty often encountered by a surveillance system operator is having to repeatedly view multiple locations in a monitored area in relatively quick succession. For example, a single camera may be used to monitor several gambling tables in a casino or several cashier windows in a bank. To further complicate matters, not only does the operator have to quickly and accurately position the camera, but he/she also has to adjust the camera zoom, focus, and/or white balance setting. It would be advantageous if the surveillance camera system automatically adjusted the camera settings based on the camera's position. It would be better yet, to be able to record a sequence of camera positions and a set of camera settings associated with each position so that the recorded sequence could be played back as desired with little or no operator intervention.

Yet another disadvantage of the known surveillance camera systems relates to the difficulty of installing and servicing the systems. More specifically, the buildings in which the remote camera units are deployed have ceiling heights or constructions that usually vary from building to building. The ceilings may be constructed from tiles or panels that are badly warped. Furthermore, the thickness of the ceiling panels or tiles varies from site to site. The known systems leave something to be desired in accommodating such variations. Further still, in many cases, the ceiling-mounted camera unit is accessible only with a long ladder. Obtaining access to the interior of the camera unit often requires a service technician to simultaneously handle several pieces including tools, test equipment, a dome, a decorative ring, and any components requiring replacement. In the known systems, testing of the camera unit requires communication with another individual located at the camera system control console. It suffices to say that installation and servicing under such conditions is very difficult and can be dangerous. Accordingly, it would be highly desirable to have a remote camera unit that is easy to install and service.

SUMMARY OF THE INVENTION

In accordance with one aspect of the present invention there is provided a surveillance camera unit for monitoring a selected area which includes a housing and a pan motor platform fixedly mounted to the housing. A pan motor is fixedly mounted to the pan motor platform. Also provided is a tilt motor platform rotatably mounted to the pan motor platform to permit rotation of the tilt motor platform about a pan axis. A first mechanical coupling between the pan motor and the tilt motor platform effects rotation of the tilt motor platform about the pan axis during operation of the pan motor. A tilt motor is fixedly mounted to the tilt motor platform and a camera is rotatably mounted to the tilt motor platform such that the camera can be rotated about a tilt axis. A second mechanical coupling is included between the tilt motor and the camera to effect rotation of the camera about the tilt axis during operation of the tilt motor. A slip ring is mounted on the pan motor platform for providing electrical connections to the tilt motor and the camera.

In accordance with another aspect of the present invention there is provided a method for monitoring a selected area using a surveillance camera unit having a camera module and a monitoring system, in which the camera module includes a pan-and-tilt mechanism having a tilt motor for tilting a camera and a pan motor for panning the camera. The tilt motor operates at a selected traveling speed to effect tilting of the camera such that the camera moves from a generally horizontal position to a generally vertical position. The tilt position and tilt traveling speed of the camera are monitored by an on-board controller. The tilting speed is compared to a reference tilting speed. When the camera is substantially in its vertical position and the tilt speed of the camera is at least equal to the magnitude of the reference tilting speed, the camera is automatically pivoted by operating the pan motor so that the camera pans 180 degrees.

In accordance with a further aspect of the present invention there is provided a method for monitoring a selected area using a surveillance camera unit having a camera module and a monitoring system, in which the camera module includes a pan-and-tilt mechanism having a tilt motor for tilting a camera and a pan motor for panning the camera. The tilting and panning of the camera is manually controlled to locate the camera at each of a series of selected combinations of pan and tilt positions. Each of the combinations of tilt and pan positions of the camera are recorded at pre-determined time intervals during panning and tilting of the camera and the recorded combinations of pan and tilt positions are stored. Thereafter, the recorded combinations of pan and tilt positions are retrieved in a desired sequence and the camera is panned and tilted to the respective pan and tilt positions in the desired sequence.

In accordance with yet another aspect of the present invention there is provided a method for monitoring a selected area using a surveillance camera unit having a camera module and a monitoring system, in which the camera module includes a pan-and-tilt mechanism having a tilt motor for tilting a camera and a pan motor for panning the camera. A home tilt position for the camera is calibrated in an on-board controller by operating the tilt motor for a predetermined time such that the camera is driven against a stop at a selected tilt position on the pan-and-tilt mechanism. A home pan position for the camera is calibrated in the on-board controller by operating the pan motor until a homing sensor located on the pan-and-tilt mechanism is activated. Thereafter, the tilt motor and the pan motor are operated to effect tilting and panning of the camera to locate the camera at a selected tilt position and pan position. The tilt and pan positions of the camera are tracked relative to the home tilt and pan positions, whereby the instantaneous pan-and-tilt positions of the camera are known.

BRIEF DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
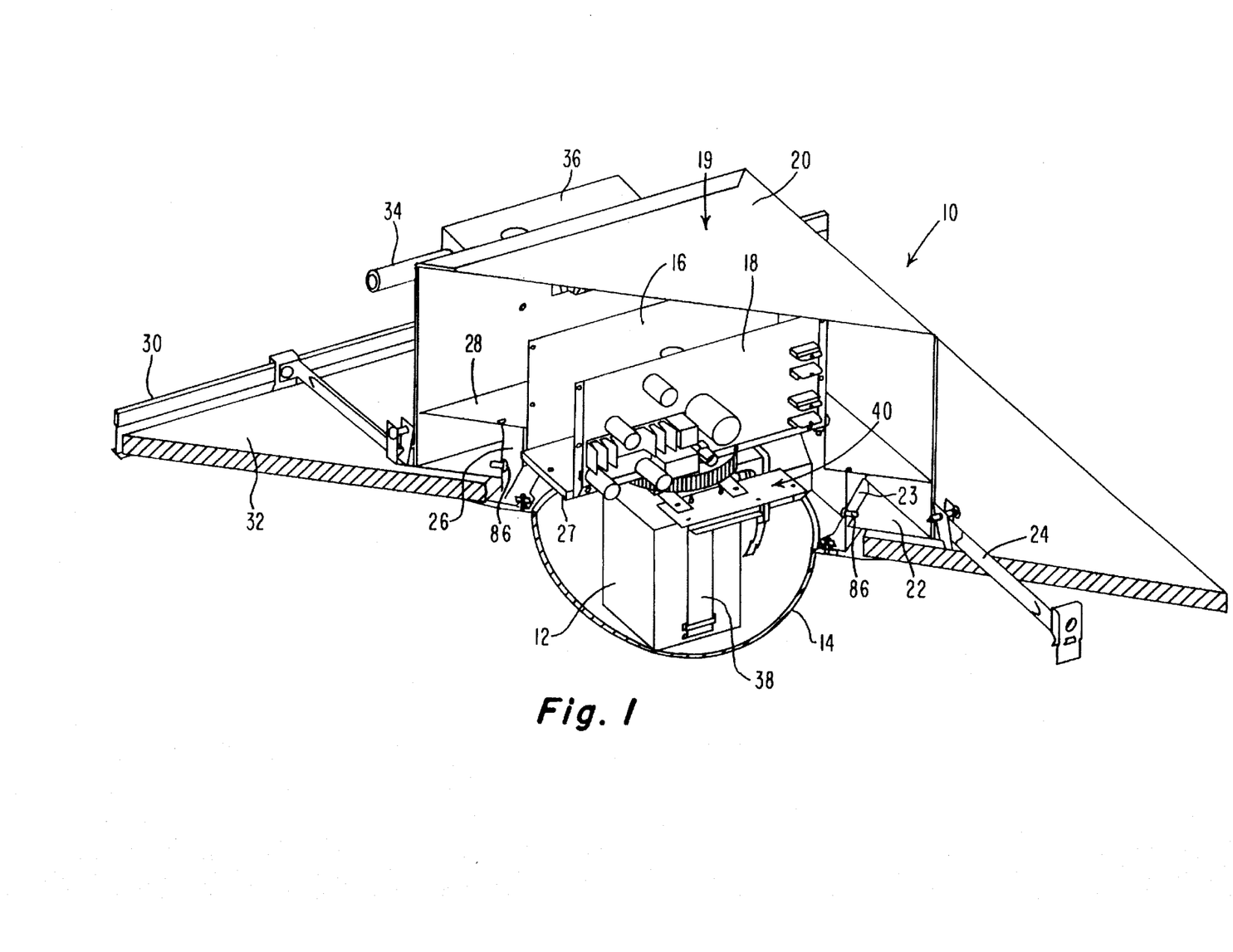
FIG. 1 is a perspective view, in partial section, of a dome camera module in accordance with the present invention.
Figure 9:
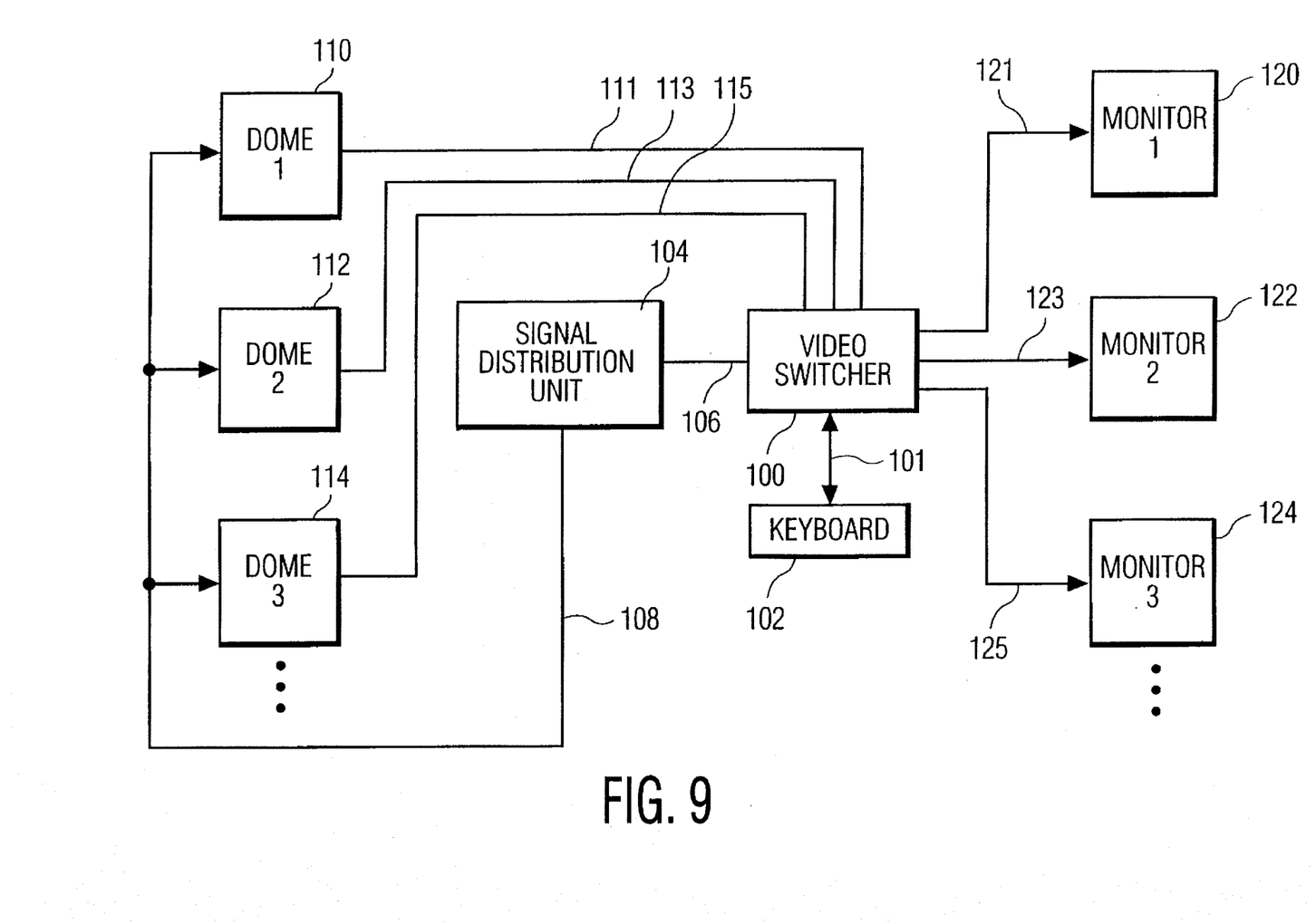
FIG. 9 is a block diagram of a dome camera surveillance system in accordance with the present invention.

Referring now to the drawings wherein like reference numerals refer to the same or similar components across the several views, and in particular to FIG. 1, there is shown a dome camera module, generally designated 10, for monitoring a selected area. The dome camera module 10 includes a camera 12 that captures real-time images of the selected area and transmits the images to a central monitoring station, or possibly to multiple monitoring stations, for viewing by an operator as shown in FIG. 9. A number of dome camera modules 10 may be located at strategic locations throughout the monitored area to provide multiple views of the area to the central monitoring station.

Preferably, the dome camera module 10 is installed into an existing ceiling in the area to be monitored. A hemispherical, translucent dome 14 preferably formed of an acrylic material, extends below the ceiling to enclose the camera 12. The dome 14 is preferably semi-transparent to permit the camera 12 to view the monitored area in a manner that is unobtrusive to persons present in the monitored area.

A housing, generally designated 19, encloses the components of the dome camera module 10 above the ceiling. The housing 19 has a stationary outer shell that includes a protective cover box 20 and a base 22. The base 22 has an upwardly extending inner lip 23 that extends along the inner periphery of the base 22. A series of threaded holes are formed in the inner lip 23 of base 22. A plurality of horizontal support bars 24 are formed at one end to be attached to the base 22. The other end of a support bar 24 is formed to be clipped onto a support span 30 of the ceiling grid to secure the dome camera module 10 to the ceiling.

The housing 19 includes an adjustable inner frame that is disposed within the outer shell of the housing 19 and that permits height adjustment of the dome 14 relative to the outer shell to allow for variations in thickness of ceiling panels or tiles. The outer shell of the housing 19 is mounted above the ceiling tiles and thereafter, the inner frame is adjusted from below the ceiling. The inner frame includes a plurality of interconnected walls 26 forming a structure that is connected to a peripheral horizontal support 28. The adjustable inner frame can be more readily understood with reference to FIGS. 7 and 8.

Figure 7:
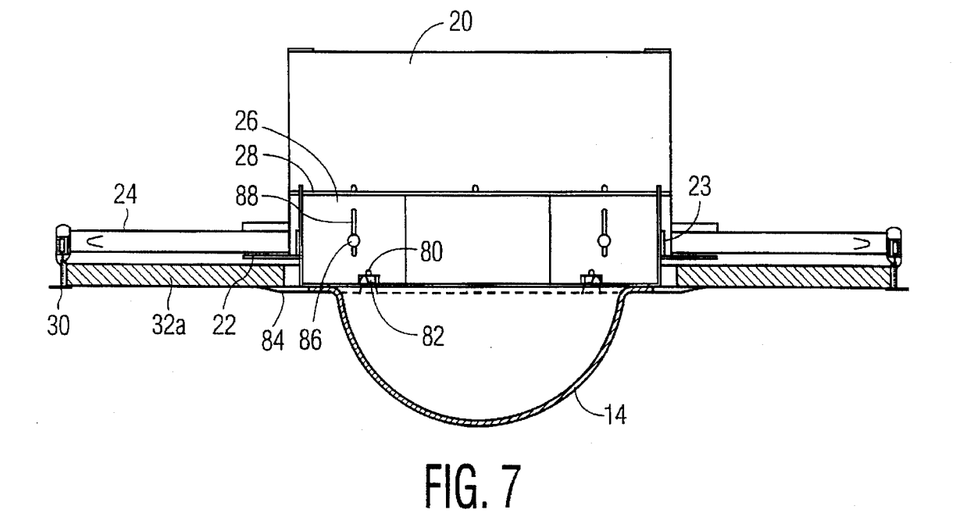
FIG. 7 is a first side elevation view, in partial section, of the mounting assembly for the dome camera module of FIG. 1.
Figure 8:
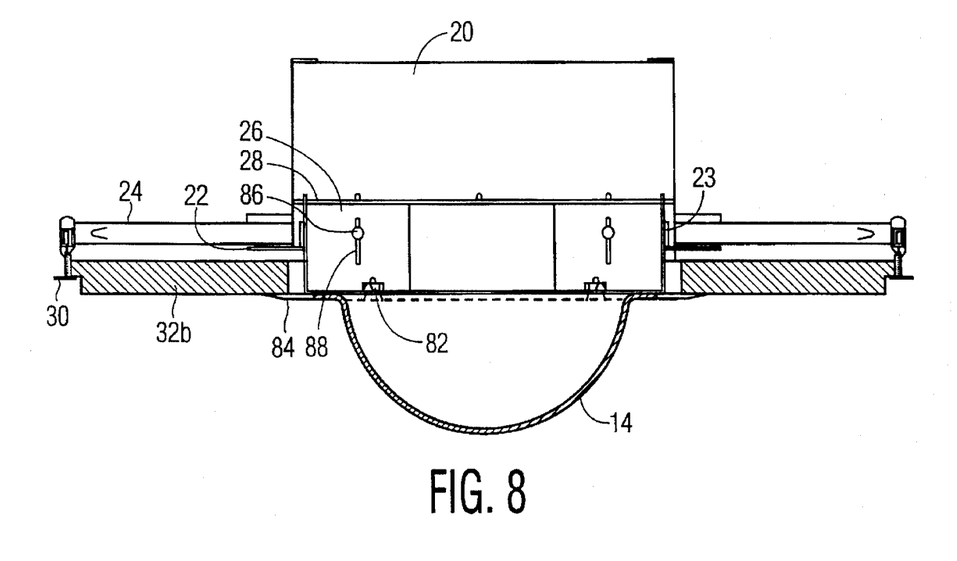
FIG. 8 is a second side elevation view, in partial section, of the mounting assembly for the dome camera module of FIG. 1.

As shown in FIGS. 7 and 8, several walls 26 have a slot 88 formed therein that aligns with a threaded hole formed in the inner lip 23 of base 22. A screw or bolt 86 attaches the wall 26 to the inner lip 23. The inner frame can be vertically adjusted by loosening screws 86 and moving the inner frame up or down. As a consequence of this arrangement, the dome camera module 10 may be easily mounted in ceilings having various thicknesses or in a warped ceiling. For example, FIG. 7 shows mounting of the dome module 10 in a relatively thin ceiling 32a, whereas FIG. 8 shows mounting of the dome module 10 in a thicker ceiling 32b. In both instances, as desired, the dome 14, and a mating trim ring 84 abut the ceiling 32. The dome 14 is held in position with a ball stud and mating clip arrangement 82.

Referring back to FIG. 1, the adjustable inner frame of the housing 19 supports a pan and tilt assembly, generally designated 40, and a dome controller, which is embodied in circuit boards 16 and 18. The operation of the pan and tilt assembly 40 can be better understood with reference to FIG. 2. The pan and tilt assembly 40 includes a pan motor platform 27, mounted in fixed relation to the adjustable inner frame of housing 19. In the embodiment shown, the pan motor platform 27 mounts directly to the horizontal support 28. Rubber ring bumpers or spacers 29 are disposed between the platform 27 and the horizontal support 28 at the points of connection therebetween to provide vibration isolation between the housing 19 and the pan and tilt assembly 40.

Figure 2:
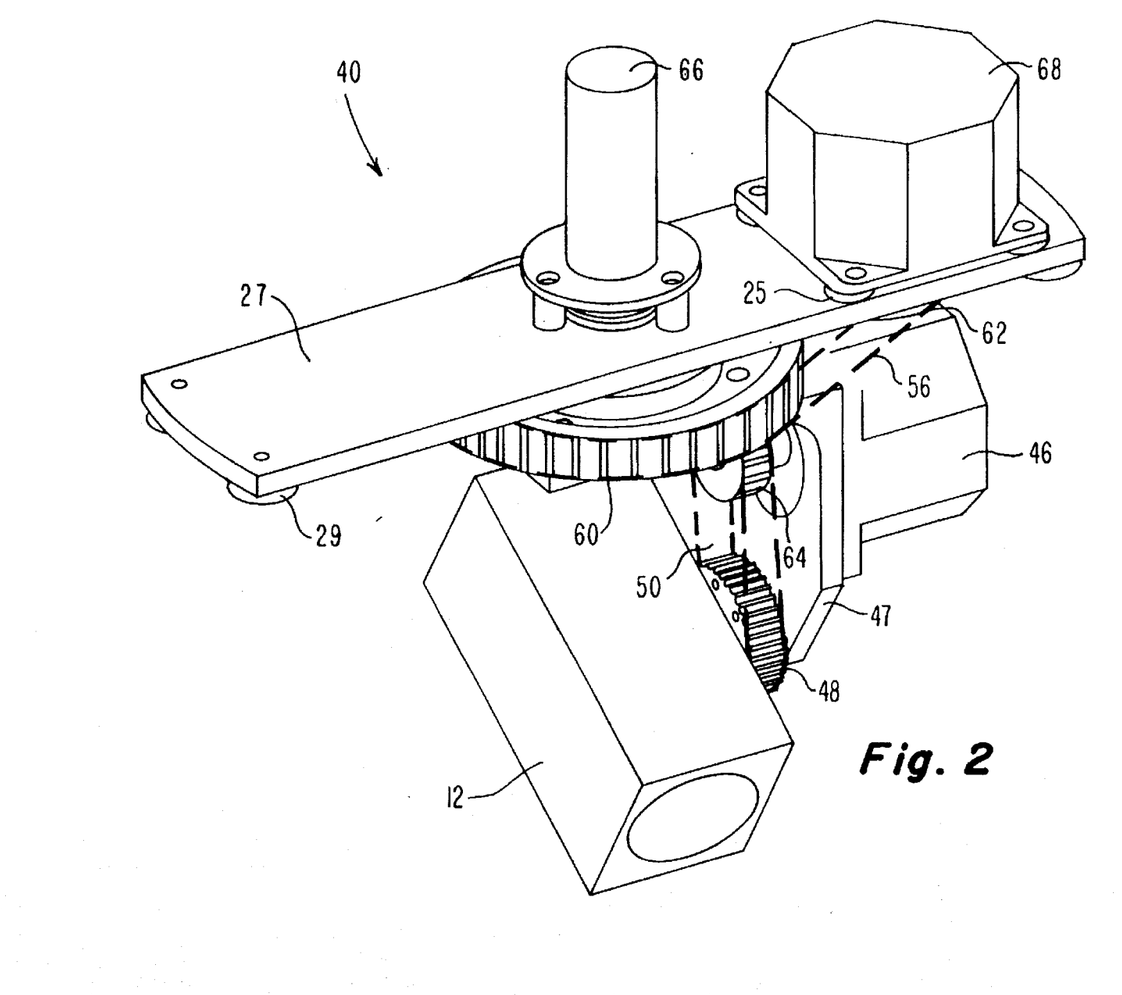
FIG. 2 is a simplified perspective view of a pan and tilt assembly for the dome camera module shown in FIG. 1.

A pan motor 68, which is preferably a stepper motor, is mounted to the pan motor platform 27. Rubber ring bumpers 25 are disposed between the pan motor 68 and the pan motor platform 27 to provide vibration isolation between the motor 68 and the housing 19. The pan motor 68 includes a shaft that passes through the pan platform 27 and extends to the underside of the platform. A pulley 62 is affixed to the pan-motor shaft. A timing belt 56, shown in phantom, mechanically couples pulley 62 to drive a second pulley 60 which is rotatably mounted to the underside of the pan motor platform 27. The second pulley 60 has an annular bearing (not shown) mounted in the center thereof to permit relatively unrestricted rotation of the pulley 60 when being driven by the pan motor 68. Furthermore, a hollow, eccentric shaft (not shown) is used for mounting the pulley 60 to the pan motor platform 27 and to permit tensioning of the timing belt 56.

A tilt platform 47 in the form of a generally L-shaped yoke is supported from the pulley 60. A tilt motor 46, preferably a stepper motor, is mounted on one leg of the tilt platform 47. The tilt motor 46 has a shaft that extends through the tilt platform 47. A third pulley 64 is affixed to the tilt motor shaft and is mechanically coupled to a fourth pulley 48 by a second timing belt 50, shown in phantom. An annular bearing and eccentric shaft (both not shown) are utilized to mount the pulley 48 to the tilt platform 47.

Figure 3:
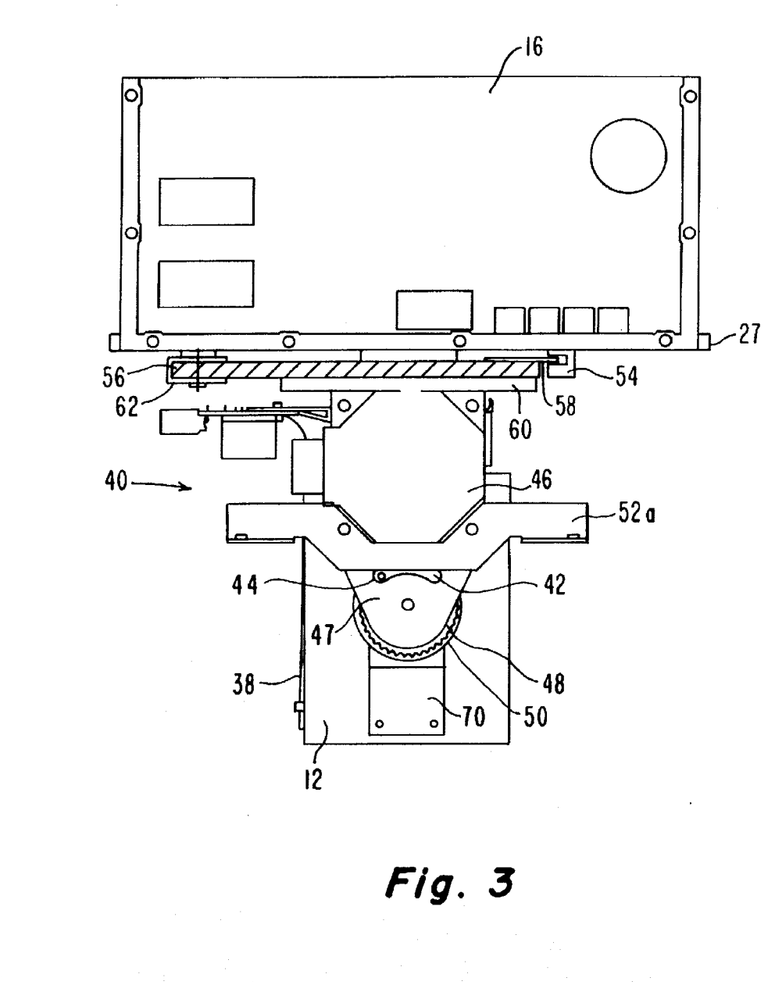
FIG. 3 is a rear elevation view of the pan and tilt assembly shown in the dome camera module of FIG. 1.
Figure 4:
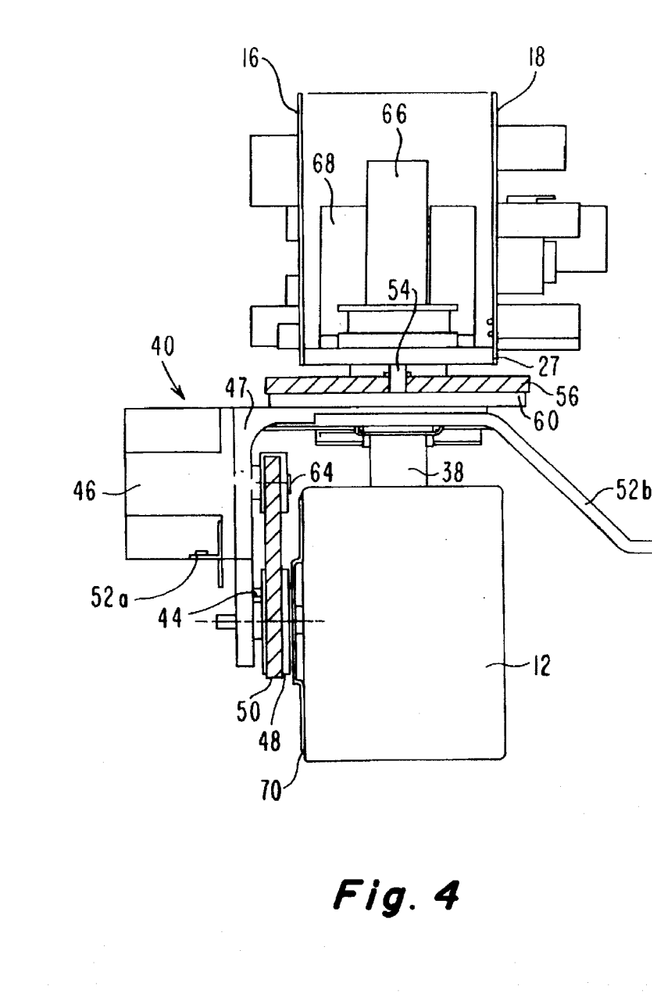
FIG. 4 is a side elevation view of the pan and tilt assembly shown in FIG. 3.

As shown in FIGS. 3 and 4, shroud supports 52a and 52b are mounted to the tilt motor platform 47. An opaque, hemispherical shroud (not shown) is attached to the shroud supports 52a, 52b and moves with the tilt motor platform 47 during panning of the camera 12. The shroud includes a vertical slot that corresponds to the tilt range of the camera 12 to permit viewing of the monitored area over the entire tilt range of the camera 12. A bracket 70 is affixed to the camera 12 and to the pulley 48 for supporting the camera from pulley 48 such that the camera rotates concurrently with the pulley 48.

As shown in FIG. 3, a pin 44 extends from one side of pulley 48 into engagement with a slot 42 formed in the tilt motor platform 47. This arrangement restricts the angular rotation of pulley 48, and consequently camera 12, to a range of approximately 100 degrees. The pin and slot arrangement also provides a hard stop at either end of the tilt range.

Referring back to FIG. 2, a slip ring 66 is mounted to the pan motor platform 27. The slip ring 66 provides electrical connections to the tilt motor 46 and camera 12 from the dome camera module controller and permits continuous panning of the camera 12 in either clockwise or counterclockwise direction. Because the pan motor 68 is mounted on the pan platform 27 electrical leads to the pan motor 68 need not pass through slip ring 66, thereby simplifying its construction. A further advantage realized by having the pan motor 68 located on the pan platform 27 is that the weight and size of the moving components are substantially reduced, thereby resulting in increased response and speed in the panning operation for a given size of pan motor.

Figure 5:
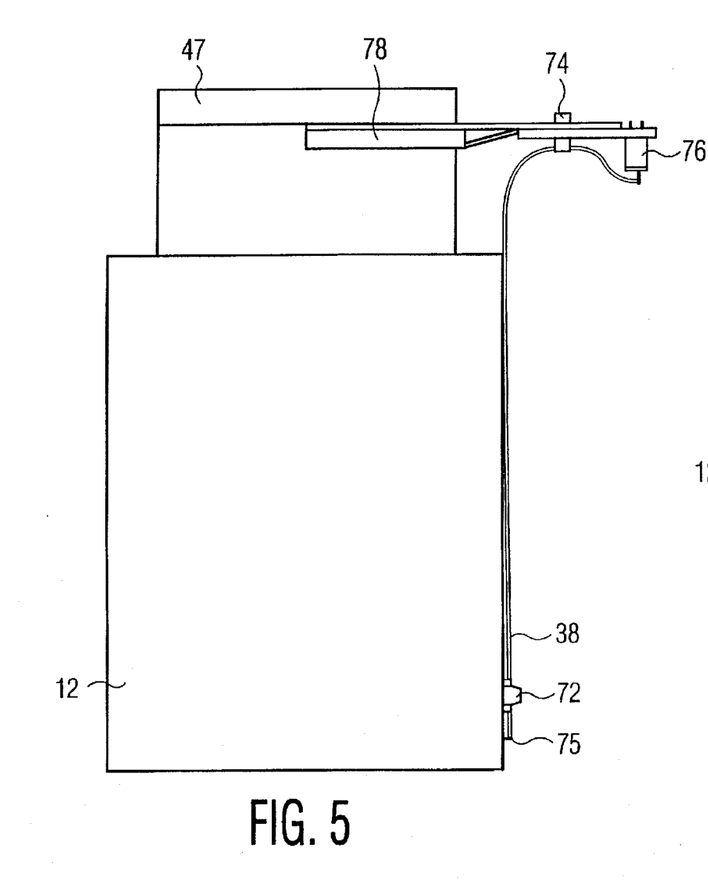
FIG. 5 is a first side elevation view of the camera and its associated flexible electrical connection shown in the dome camera module of FIG. 1, the camera being in the vertical position.
Figure 6:
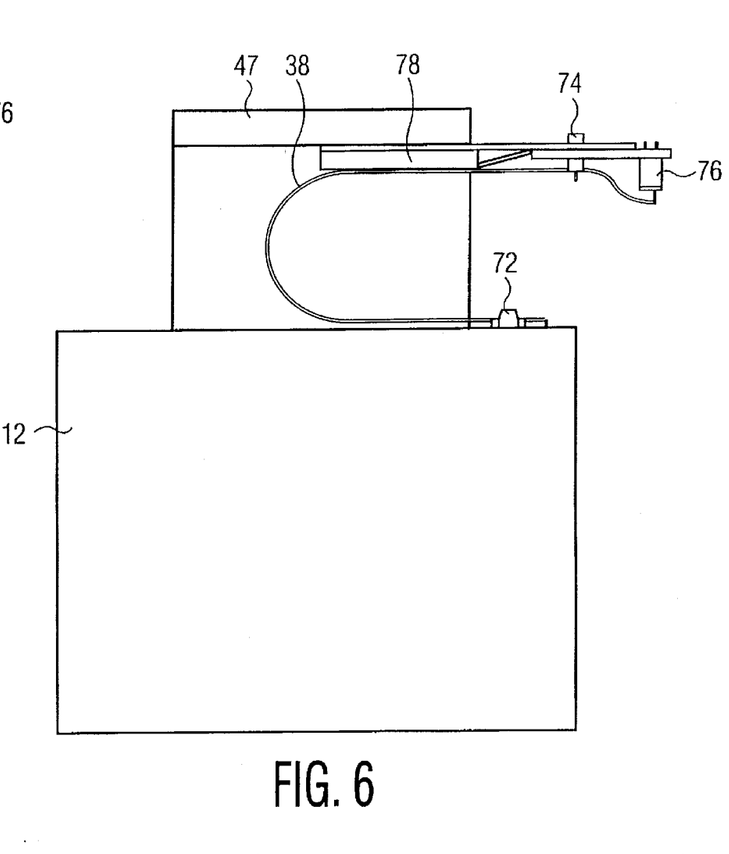
FIG. 6 is a second side elevation view of the camera and flexible electrical connection shown in FIG. 5, the camera being in the horizontal position.

Referring now to FIGS. 5 and 6, there is shown a preferred arrangement for electrically interconnecting the camera 12 to the slip ring 66. A multi-conductor flex cable 38, such as type FPC manufactured by AMP, is connected at one end to the camera 12 by means of a suitable connector 75. Cable 38 is connected at its other end to a second connector 76. The flex cable 38 is positioned in surface-to-surface relation adjacent to the camera 12. The flex cable 38 is aligned to flex in conjunction with tilting of the camera 12. As shown in FIG. 5, when the camera 12 is in the full vertical position, the flex cable 38 is flexed to form an inverted "L" or "J". Whereas when the camera 12 is in the full horizontal position, as shown in FIG. 6, the cable 38 is flexed to form an elongated "C". Such an arrangement greatly reduces the likelihood of damage to the flex cable 38. To further reduce the risk of damage to the flex cable 38, strain-reliefs 72 and 74 are positioned adjacent connectors 75 and 76 respectively. Still further, a protective shield 78 mounted to the tilt platform 47 adjacent flex cable 38 has a smooth surface to prevent cable wear resulting from repeated rubbing against the tilt platform 47 during upward and downward tilt movements of the camera 12.

Referring now to FIG. 9, there is shown schematically a dome camera surveillance system according to the present invention. A video switcher 100, located at a central monitoring location controls the overall operation of the camera surveillance system. A keyboard 102 is connected to the video switcher 100 via a multi-conductor cable 101. The keyboard 102 includes a joy stick, a plurality of function buttons, and an alphanumeric display. An operator uses the keyboard 102 to select the display of images provided by one or more dome camera modules 10. For instance, the operator can select viewing of images provided by a particular dome camera module 10 or can select sequential viewing of images provided by multiple dome camera modules on one or more video monitors.

The operator can also control the positioning of the camera within any dome camera module 10 using the joy stick. To do so the operator initially selects a particular dome camera module 10 using the keyboard 102. During selection, the display on the keyboard shows the indicia that identify the selected dome camera. After dome selection is completed, camera positioning may be controlled using the keyboard joy stick. For example, if the operator moves the joy stick to the left or right, the pan motor 68 is activated inside the dome camera module, thereby causing the camera to pan left or right. Similarly, if the operator moves the joy stick fore or aft, the tilt motor 46 is activated, resulting in the camera tilting up or down. Further, the operator may control certain camera functions, such as focusing, zooming and white balance, from the keyboard. Further yet, the operator can select automatic operation of one or more camera functions to provide enhanced images of the monitored area and to simplify the task of monitoring the area under surveillance. The various features of the camera surveillance system relating to control of the camera functions are disclosed in a commonly-owned, co-pending application entitled "Video Surveillance System" filed concurrently herewith and incorporated herein by reference, now U.S. Pat. No. 5,517,236, issued May 14, 1996.

The video switcher 100 samples the output of the keyboard 102 at periodic intervals and transmits a control message based on the keyboard output to all dome camera modules on the system. The video switcher is connected to a signal distribution unit 104 that converts the TTL signal sent by the video switcher 100 over line 106 into a balanced signal. The balanced signal is transmitted via twisted pair cable 108 to the dome controllers 110, 112, 114. The twisted-pair cable 108 runs directly to each dome controller from the signal distribution unit 104 or, alternatively, is daisy-chained from one dome controller to another.

The control message sent to the dome controllers 110, 112, 114 includes an address that uniquely identifies a particular dome controller. Only the dome controller having a matching address processes the control message. All other domes disregard the broadcast control message. Each control message also contains keyboard status information, which includes camera control commands. Such information includes joy stick horizontal position (pan direction and pan speed), joy stick fore and aft position (tilt direction and tilt speed) and camera control, such as zoom, focus and white balance adjustment.

Communication between the video switcher 100 and the dome controllers 110, 112, 114 is unidirectional. Alternatively, full-duplex communication using a serial communication protocol, such as RS-232, can be utilized so that the video switcher 100 receives camera status information from the dome controllers.

A separate video signal is transmitted from each of the dome controllers 110, 112, 114 along signal lines 111, 113, 115 and is received by the video switcher 100. The operator controls the video signal path through the switcher 100 to one or more video monitors. For example, FIG. 9 shows three video monitors 120, 122, 124 that receive video signals from the video switcher 100 via video cables 121, 123, 125. In that configuration, images from any of the dome controllers 110, 112, 114 can be displayed on any of the monitors 120, 122, 124.

Figure 10:
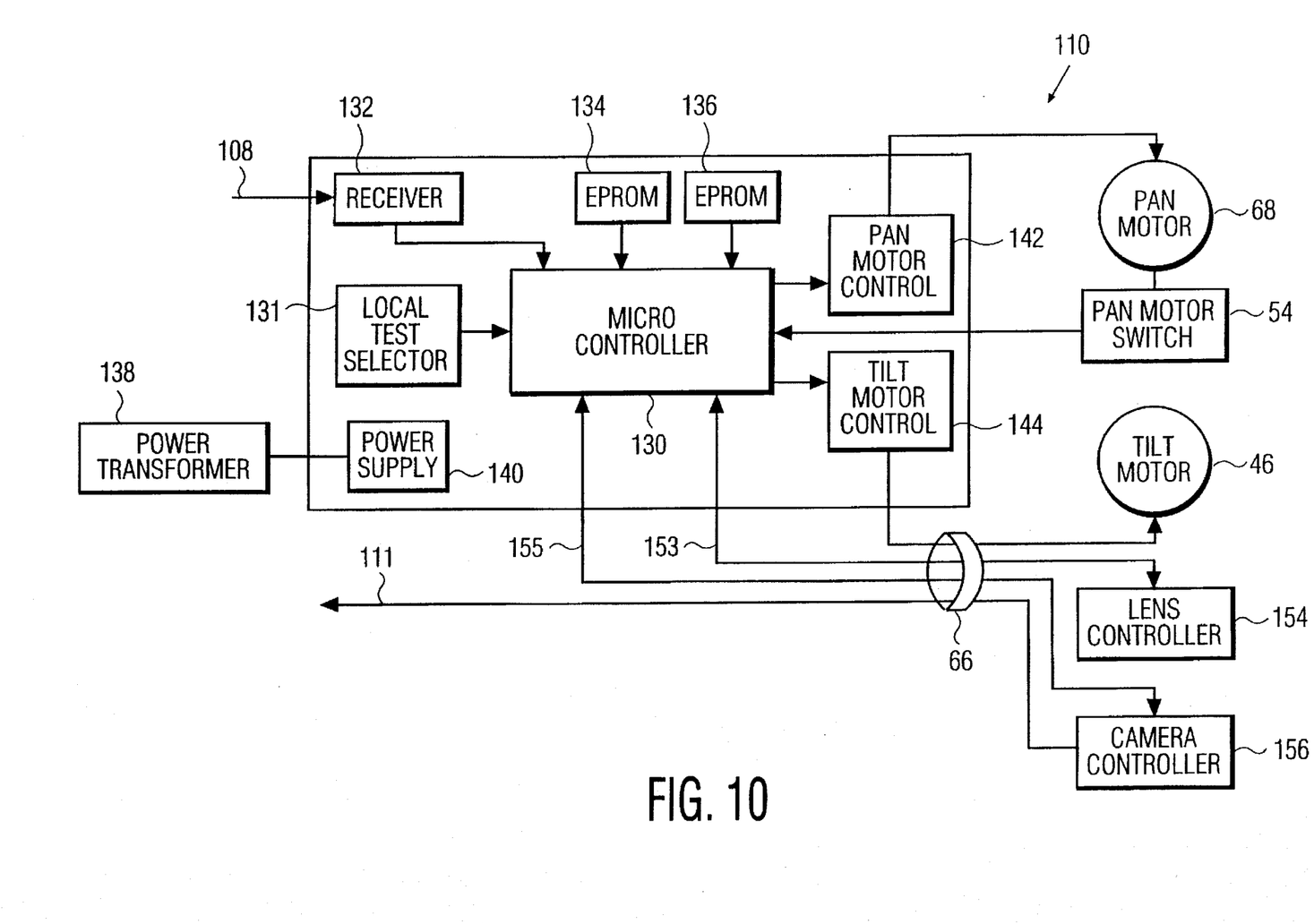
FIG. 10 is a block diagram of a control subsystem for a dome camera module in the surveillance system according to the present invention.

Referring now to FIG. 10, there is shown a dome controller 110 which includes a MC68HC16 micro-controller 130 of the type manufactured by Motorola Incorporated. The micro-controller 130 manages the functions of the dome camera module 10. Such functions are dictated by commands sent from the video-switcher 100 located at the remote central monitoring station. The micro-controller 130 executes a program that is stored in a non-volatile memory, embodied as an EPROM 134. In addition, the micro-controller 130 has internal data registers for storing frequently-changed and run-time variables. An EEPROM 136 is utilized for storing system configuration and setup variables because such a device retains its data when power to the dome controller 10 is turned off.

A local test selector 131 is included on the dome controller 110. The selector 131, which has a push button and a four-digit thumbwheel, serves two primary functions. First, a service technician can use the local test selector 131 for diagnostic servicing by dialing in a diagnostic code on the thumbwheel and then activating the push button to execute the corresponding function. For instance, the technician can set the thumbwheel for a tilt motor downward movement and then activate the push button to move the tilt motor 46 in the selected direction. In this manner the technician is able to diagnose, service, or test the dome camera module 10 without requiring activation of dome camera module functions from the central monitoring station, i.e., through keyboard 102.

In the second primary function, the local test selector 131 is used to assign an address to the dome controller 110. More specifically, the thumbwheel of the local test selector 131 is set to a desired 4-digit address. Subsequently, when control messages are sent to the dome controller 110, the address that is included in the prefix of the control message is compared against the setting on the local test selector.

The dome controller 110 includes a communication receiver 132 that receives a control message from the video switcher 100 in a serial :format and converts it to a parallel format. The control message is then sent to the micro-controller 130 for processing. The micro-controller 130 determines whether the address present in the control message matches the address of the dome controller 110. If there is no match, then the micro-controller 130 ignores the remainder of the control message. If, however, the control message address matches the dome camera module address, the control message is processed by the micro-controller 130.

The dome controller 110 includes a means for precisely controlling movements of the pan motor 68 and the tilt motor 46. A pan motor control circuit 142 and tilt motor control circuit 144 are provided for controlling the motors 68 or 46, respectively.

In the preferred embodiment, pan motor 68 and tilt motor 46 are stepper motors and each is formed to have 200 full steps, each step corresponding to 1.8 degrees of rotation. However, intermediate step positions are selected by utilizing motor controllers 142 and 144 to micro-step the motors. Each full step is divided into 125 micro-steps to provide a total of 25,000 micro-steps per revolution. Although the total number of micro-steps is the same for the pan motor 68 and tilt motor 46, the amount of angular panning movement of the camera per step differs from the amount of angular tilting movement per step. In the case of the pan drive system a ratio of 5:1 is used between pulley 60 and pulley 62. Thus, for each micro-step of pan motor 68, the camera pans 0.00288 degrees. In the case of the tilt motor 46, a ratio of 2:1 is used between the pulley 48 and pulley 64. Thus, for each micro-step of the tilt motor 46, the camera tilts 0.0072 degrees.

The pan motor controller 142 and the tilt motor controller 144 also include means for regulating current flow to the motors 68 and 46 in order to reduce power consumption when the motors are in an idling or slow-moving state. To that end, a 12-bit digital-to-analog converter (DAC) in controller 110 is programmed by the micro-controller 130 to set the current level for each of motors 68 and 46. The maximum current level for each of the motors 68 and 46 is 1 amp. It has been found that a setting of 35% of the maximum current level is suitable during idling periods, a setting of 50% of the maximum current level is suitable during steady motor travel, and a setting of 75% of the maximum current level is suitable for acceleration and deceleration of the motors.

The micro-controller 130 continuously tracks the camera position respective to the home pan and tilt positions. The starting or home positions of the motors 68 and 46 are determined by a homing sequence performed with respect to each motor. The homing sequence is executed by the micro-controller 130 during initial power-up, during restart after a power-failure or after receiving a homing message from the central monitoring station.

The homing of the pan motor 68 is initiated by activating the pan motor 68. An optical switch 54 is monitored by the micro-controller 130. As shown in FIG. 3, the optical switch 54 is mounted to the pan motor platform 27 and a flag 58 is affixed to the outer perimeter of the pulley 60. When the pulley 60 rotates the flag 58 eventually aligns with the optical switch and blocks the sensor in optical switch 54 for a brief period of time. At all other times the sensor in optical switch 54 remains unblocked. When the sensor in optical switch 54 is blocked, the home position for the pan motor 68 is calibrated by the micro-controller 130. When the home position has been calibrated, the pan motor 68 position can thereafter be tracked by counting the number of steps issued to the pan motor 68 by the pan motor controller 142. In that manner, the pan motor 68 can be stopped, restarted, or operated continuously, and its location is continuously tracked relative to the home position. Such open-loop control eliminates the need for sensors, such as potentiometers or encoders, to determine the current pan position of the camera 12. In addition, the home position of the pan motor 68 can be recalibrated whenever the sensor of optical switch 54 is blocked by the flag 58. For instance, if the pan motor 68 is in a continuous panning mode of operation, recalibration of the pan motor home position occurs once for each revolution of pulley 60. Recalibration in this manner prevents any error buildup in tracking the pan position of the camera 12.

The homing sequence for the tilt motor 46 differs from that of the pan motor 68. Rather than utilizing an optical sensor, which would require additional connections through the slip ring 66, a mechanical stop is used to calibrate the home position of the tilt motor 46. As shown in FIG. 3, the pin 44 extending from pulley 48 engages with the curved slot 42 formed in tilt platform 47. As the pulley 48 rotates in response to activation of tilt motor 46, the pin 44 travels within slot 42 to limit angular displacement of the camera. The tilt motor 46 is run in an open-loop mode and there is no feedback to the micro-controller 130 to inform it when the upper-most tilt position has been reached. During the tilt motor homing sequence, the tilt motor 46 is activated so that the camera 12 moves to a generally horizontal position, as shown in FIG. 6. The tilt motor 46 is activated for a period of time sufficient to ensure that the camera 12 travels to the full horizontal position. During such operation, the pin 44 contacts one end of the slot 42 and causes the tilt motor 46 to slip for a brief period. After the motor activation period expires, the tilt motor 46 is operated in reverse for a selected number of steps, thereby establishing the tilt motor home position. Similar to the pan motor 68, subsequent movement of the tilt motor is tracked by counting steps from the home position.

Referring back to FIG. 10, a lens controller 154 and camera controller 156 are included in the dome camera module 10. The lens controller 154 and camera controller 156 each receive commands from the central monitoring station through the micro-controller 130 or directly from the micro-controller 130. Communication between the lens controller 154 and the micro-controller 130 is effected through a bi-directional synchronous communication link 153. Whereas communication between the micro-controller 130 and the camera controller 156 is effected through a bi-directional asynchronous communication link 155. Examples of commands sent to the lens controller 154 include a manual focus command .and an auto-focus command from the central monitoring station and a focus positioning command sent by the micro-controller 130 based on tilt motor and pan motor positioning. Examples of commands to the camera controller 156 include a manual white balance and auto-white balance command from the central monitoring station, as well as a white balance level command from the micro-controller 130 based on the positions of the tilt and pan motors.

Power is provided to the dome controller 110, lens controller 154, camera controller 156, pan motor 68, and tilt motor 46 from a power supply 140 located in the dome controller 110. A power transformer 138 steps-down the AC line voltage from an external source to the power supply. The AC power conductor is fed through a conduit 34 into a separate wiring box 36, which houses the transformer 138, as shown in FIG. 1.

As previously discussed, the micro-controller 130 continuously tracks the position of the pan motor 68 and tilt motor 46. The most current position is stored in data registers located within micro-controller 130. Several automated features can be activated by the micro-controller 130 based on pan and tilt motor positions.

An auto-pivot feature is provided which is especially useful when viewing a person walking down a hallway or aisle and passing underneath the dome camera module 10. When the auto-pivot function is selected by the operator at the central monitoring station, the micro-controller 130 monitors the tilt motor position and the tilt motor speed that is selected by the operator using the keyboard joy stick. The video switcher 100 periodically transmits a tilt motor direction and speed signal to the dome controller 110. If the camera position is determined to be in a generally vertical position, i.e., the camera is capturing images directly below the dome camera module 10, and if the selected tilt motor speed is greater than a selected threshold auto-pivot speed, then the following sequence is automatically executed by the micro-controller 130. First, the tilt motor 46 is deactivated just prior to pin 44 contacting the end of the slot 42. Next, the pan motor 68 is automatically activated to pan 180 degrees and then deactivated. Finally, the tilt motor 46 is activated to cause the camera 12 to travel from the full vertical position toward the horizontal position.

However, if the tilt motor 46 is in a generally vertical position, but the tilt motor speed is less than the threshold auto-pivot speed, then the auto-pivot function is not executed by the micro-controller 130. Instead, the tilt motor 46 is deactivated when the camera 12 reaches the full vertical position. The tilt motor 46 remains in this position until a tilt speed signal exceeding the threshold auto-pivot speed is selected with the joy stick. In this manner, if a person walking down a hallway or aisle, slows down and stops directly below the dome camera module 10, the tilt motor 46 can be stopped to hold the camera 12 at its vertical position without inadvertently activating the auto-pivot function. Furthermore, if the person reverses direction and travels away from the dome camera module 10 the tilt motor 46 can simply be reversed to so that the person can be continuously viewed. However, if the person continues down the hall in the original direction, the pan motor can be manually activated to pivot the camera or the tilt motor speed can be increased to cause execution of the auto-pivot function as described above.

The auto-pivot sequence may be alternatively activated upon expiration of a selected time-out period. In this mode, when the tilt motor 46 is determined to be in a generally vertical position, the tilt motor 46 is deactivated. Thereafter, the selected tilt motor speed is monitored. If the tilt motor speed is maintained at a selected level for a duration exceeding the selected time-out period, the auto-pivot sequence is executed. A further alternative of the auto-pivot function combines monitoring of the tilt motor speed and the time-out period. In the combined mode, a tilt motor speed exceeding the threshold auto-pivot speed and the expiration of the selected time-out period is required to initiate the auto-pivot sequence.

EEPROM 136 of dome controller 110 stores a set of pre-positions. A pre-position is a set of variables that defines a camera state including its pan position, tilt position, and camera settings, such as zoom location, focus location, and white balance level. Upon request, the micro-controller 130 reads pre-position information from the EEPROM 136 and activates the pan motor 68 and tilt motor 46 to reorient the camera from a first location to the location defined by the pre-position. At the same time, the micro-controller 130 sends lens control and camera control messages to the lens controller 154 and camera controller 156, respectively, which in turn perform the necessary operations to achieve the preposition lens and camera settings.

The present invention also includes a tour feature, which "plays back" a recorded sequence of pre-positions. The pre-positions may be recorded by various methods. In one method, the operator positions the camera 12 by activating the pan motor 68 and the tilt motor 46 until the desired viewing location is reached. Next, the operator adjusts the camera and lens settings as necessary to obtain the best image of the location being viewed. For instance, the operator can select a close-up view by activating a keyboard zoom button and then adjust the camera focus by activating a focus button. After all the adjustments are completed, a pre-position number is selected via the keyboard. In addition, a command to set the selected pre-position is initiated using the keyboard, at which time the pre-position set command and the selected pre-position number are transmitted to the dome controller 110 to instruct the controller to store the current camera position and settings in EEPROM 136. As many as 60 pre-positions can be recorded in this manner. Subsequently, the operator can select play back of the stored prepositions in a sequential manner. Alternatively, the operator may select a subset of the pre-positions for play back in any desired order.

An alternate tour mode requires that the operator continuously position the camera by manipulating the joy stick and change camera settings as desired. While the operator is "recording" in this manner, the keyboard status (e.g. position of the joy stick) is monitored by the video switcher 100 at 50 millisecond increments and is stored as a keyboard command in a memory located on the video switcher 100. Thereafter, the operator can select play back of the stored keyboard commands, at which time the video switcher retrieves the commands stored in the memory and sends messages to the dome controller 110 as if the operator were directly controlling camera movement and camera settings.

The micro-controller 130 can also be programmed to automatically adjust pan and tilt motor speeds, a function referred to as speed scaling. Speed scaling is a method for accurately tracking a moving target based on its distance from the camera 12. For instance, if a person located a long distance from the camera is being monitored, and the camera lens is set for wide angle viewing, relatively slow panning and tilting movements are required to track the person. If the person is but a few feet from the camera, the speed of panning and tilting movements must be increased to accurately track the person. In addition, as the person moves closer to or farther from the camera, the speed of panning and tilting is automatically adjusted to compensate for the change in distances. For example, the panning speed may be set for a current zoom position. Thereafter, as the zoom position changes, the panning speed is changed proportionately. In addition, pan motor speed may be scaled as follows:

$$Speed = ((Z_{pos}/Z_{max})*(1-S_{min})) + S_{min}$$

where $Z_{pos}$ equals the current zoom position, $Z_{max}$ equals the maximum zoom position and $S_{min}$ is equal to the minimum motor speed defined as a percentage of the maximum pan motor speed. Alternatively, pan and tilt motor speeds may be scaled based on the camera's auto-focus distance or on the camera's tilt position.

The micro-controller 130 can also be programmed to calculate the shortest path between a current camera position and a desired camera position. When the micro-controller 130 is so programmed and a change in camera position is required, the micro-controller 130 compares the current pan position to the desired pan position and the pan motor 68 is then activated to move the camera 12 in the direction of the shorter path, i.e., clockwise or counterclockwise.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

What is claimed is:

1. In a surveillance camera system, a camera module for monitoring a selected area comprising:
   (a) a housing;
   (b) a pan motor platform fixedly mounted to said housing;
   (c) a pan motor fixedly mounted to said pan motor platform;
   (d) a tilt motor platform rotatably mounted to said pan motor platform to permit rotation of said tilt motor platform about a pan axis;
   (e) a first mechanical coupling between said pan motor and said tilt motor platform for effecting rotation of said tilt motor platform about the pan axis during operation of said pan motor;
   (f) a tilt motor fixedly mounted to said tilt motor platform;
   (g) a camera rotatably mounted to said tilt motor platform to permit rotation of said camera about a tilt axis;
   (h) a second mechanical coupling between said tilt motor and said camera to effect rotation of said camera about the tilt axis during operation of said tilt motor;
   (i) a slip ring mounted on said pan motor platform for providing electrical connections to said tilt motor and said camera; and
   (j) an auto-pivot means for automatically effecting rotation of said tilt motor platform about the pan axis by operating said pan motor so that said camera pans 180 degrees.

2. The apparatus as recited in claim 1, wherein said auto-pivot means comprises a local controller mounted on said pan motor platform, the local controller including means for monitoring a tilt speed and means for monitoring a tilt position of said camera, the local controller being operable to compare a tilt speed setting to a reference tilt speed and to energize said pan motor to rotate said tilt motor platform 180° about the pan axis when (a) the tilt speed setting is at least equal in magnitude to the reference tilt speed and (b) said camera is substantially in its vertical position.

3. The apparatus as recited in claim 1, wherein said camera comprises an adjustable zoom lens having a plurality of zoom settings; said camera module further comprising
   a local controller mounted on said pan motor platform, the local controller including means for recording a zoom setting of the zoom lens; and
   speed scaling means for automatically adjusting the speed of said pan motor based on the recorded zoom setting.

4. The apparatus as recited in claim 1, further comprising:
   a data storage device for receiving and storing a plurality of combinations of pan and tilt positions;
   retrieving means for retrieving the combinations of pan and tilt positions in a desired sequence; and
   play back means for automatically positioning the camera in accordance with a retrieved sequence of combinations of pan and tilt positions.

5. The apparatus as recited in claim 1, further comprising:
   a pan motor controller including first programmable means for setting a desired current level for said pan motor in proportion to a speed of said pan motor during operation thereof, wherein the desired current level for said pan motor corresponds to one of the following selected from the group consisting of idling, steady traveling, acceleration, and deceleration of said pan motor.

6. The apparatus as recited in claim 5, further comprising:

a tilt motor controller including second programmable means for setting a desired current level for said tilt motor in proportion to a speed of said tilt motor during operation thereof, wherein the desired current level for said tilt motor corresponds to one of the following selected from the group consisting of idling, steady traveling, acceleration, and deceleration of said tilt motor.

7. The apparatus as recited in claim 1, wherein said housing is adapted for mounting in a ceiling and comprises:

a base mountable over an opening in the ceiling and having an upwardly extending inner surface;

an inner frame disposed within the base for supporting said pan motor platform, the inner frame being formed for movement within the base along the upwardly extending inner surface; and fastening means for restricting a vertical movement of the inner frame relative to the base along the upwardly extending inner surface, whereby the inner frame can be vertically adjusted and fixedly positioned relative to the base to accommodate ceilings of different thicknesses.

8. In a surveillance camera system, a camera module for monitoring a selected area comprising:

(a) a housing;

(b) a pan motor platform fixedly mounted to said housing;

(c) a pan motor fixedly mounted to said pan motor platform;

(d) a tilt motor platform rotatably mounted to said pan motor platform to permit rotation of said tilt motor platform about a pan axis;

(e) a first mechanical coupling between said pan motor and said tilt motor platform for effecting rotation of said tilt motor platform about the pan axis during operation of said pan motor;

(f) tilt motor fixedly mounted to said tilt motor platform;

(g) a camera rotatably mounted to said tilt motor platform to permit rotation of said camera about a tilt axis;

(h) a second mechanical coupling between said tilt motor and said camera to effect rotation of said camera about the tilt axis during operation of said tilt motor; and (i) a slip ring mounted on said pan motor platform for providing electrical connections to said tilt motor and said camera, wherein said housing is adapted for mounting in a ceiling and comprises:

a base mountable over an opening in the ceiling and having an upwardly extending inner surface;

an inner frame disposed within the base for supporting said pan motor platform, the inner frame being formed for movement within the base along the upwardly extending inner surface; and fastening means for restricting a vertical movement of the inner frame relative to the base along the upwardly extending inner surface, whereby the inner frame can be vertically adjusted and fixedly positioned relative to the base to accommodate ceilings of different thicknesses.

9. A method for monitoring a selected area using a surveillance camera system, the system including a camera module and a monitoring station, the camera module including a camera and a pan-and-tilt mechanism having a tilt motor for tilting the camera and a pan motor for panning the camera, said method comprising the steps of:

(a) operating a tilt motor at a selected tilting speed to effect tilting of the camera such that the camera moves from a generally horizontal position to a generally vertical position;

(b) monitoring a tilt position and the tilting speed of the camera;

(c) comparing the tilting speed to a reference tilting speed; and (d) automatically pivoting the camera by operating the pan motor so that the camera pans 180 degrees when the camera is substantially in its vertical position and the tilting speed is at least equal to the magnitude of the reference tilting speed.

10. The method as recited in claim 9, further comprising the step of:

operating the tilt motor so that the camera tilts from the generally vertical position to the generally horizontal position after said step of automatically pivoting the camera.

11. The method as recited in claim 9, further comprising the step of:

automatically stopping the tilting of the camera when the camera is substantially in the vertical position and the tilting speed is less than the reference tilting speed.

12. A method of monitoring a selected area using a surveillance camera system, the system including a camera module and a monitoring station, the camera module including a camera, a focusable lens affixed to the camera, and a pan-and-tilt mechanism having a pan motor for panning the camera, said method comprising the steps of:

(a) operating the pan motor at a selected pan speed to effect panning of the camera to view a moving target;

(b) periodically reading a parameter that relates to the distance between the camera and the moving target, the parameter varying as the distance between the camera and the moving target varies; and then (c) periodically adjusting the pan speed in response to the parameter, whereby the pan speed is automatically adjusted based on the distance between the camera and the moving target.

* * * * *